United States Patent [19]

Miyamoto

[11] Patent Number: 5,758,211
[45] Date of Patent: May 26, 1998

[54] COMPACT FLASH CAMERA WITH BATTERY CHAMBER

[75] Inventor: Hidenori Miyamoto, Urayasu, Japan

[73] Assignee: Nikon Corporation, Tokyo, Japan

[21] Appl. No.: 772,869

[22] Filed: Dec. 26, 1996

Related U.S. Application Data

[63] Continuation of Ser. No. 588,283, Jan. 18, 1996, abandoned, which is a continuation of Ser. No. 187,552, Jan. 28, 1994, abandoned.

[30] Foreign Application Priority Data

Mar. 9, 1993 [JP] Japan ............... 5-072798

[51] Int. Cl.$^6$ ............................. G03B 17/02
[52] U.S. Cl. ............. 396/176; 396/418; 396/535; 396/539
[58] Field of Search ............... 396/176, 418, 396/535, 538, 539, 540, 541, 542

[56] References Cited

U.S. PATENT DOCUMENTS

| | | | |
|---|---|---|---|
| 3,693,523 | 9/1972 | Tenkumo et al. | 354/173.1 X |
| 4,001,640 | 1/1977 | Biber | 354/145.1 X |
| 4,954,858 | 9/1990 | Ohmura et al. | 354/145.1 |
| 4,959,672 | 9/1990 | Yoshino et al. | 354/173.1 |
| 5,028,943 | 7/1991 | Ishii et al. | 354/149.11 X |

FOREIGN PATENT DOCUMENTS 5-158114  6/1993  Japan .

OTHER PUBLICATIONS

Nikon Press Information, released Feb. 1, 1993.

*Primary Examiner*—Howard B. Blankenship
*Attorney, Agent, or Firm*—Shapiro and Shapiro

[57] ABSTRACT

A camera is provided in which the body is downsized as far as possible and which enables the incorporation of a large capacity power supply battery to be accomplished efficiently and compactly. A space portion in the camera body which is surrounded by a cartridge chamber, a film take-up spool chamber and a photographing optical path chamber between a photo-taking lens and an aperture portion is used as a power supply battery chamber. A power supply battery substantially equal to the lengthwise direction of a photographing image field is contained in the power supply battery chamber. Capacitors for the light emission of an electronic flash device are disposed in the containing space of the spool chamber in the camera body which is opposite to the cartridge chamber, along a side portion of the spool chamber. Further, a partition wall partitioning the power supply battery chamber and the photographing optical path chamber is bulged to a location which faces the photographing optical path chamber but does not interfere with the photographing optical path to a film surface. Also, a film rewinding gear train is disposed in a space formed at one side of the power supply battery chamber in the direction of thickness of the camera body, along the lengthwise direction of the power supply battery.

22 Claims, 6 Drawing Sheets

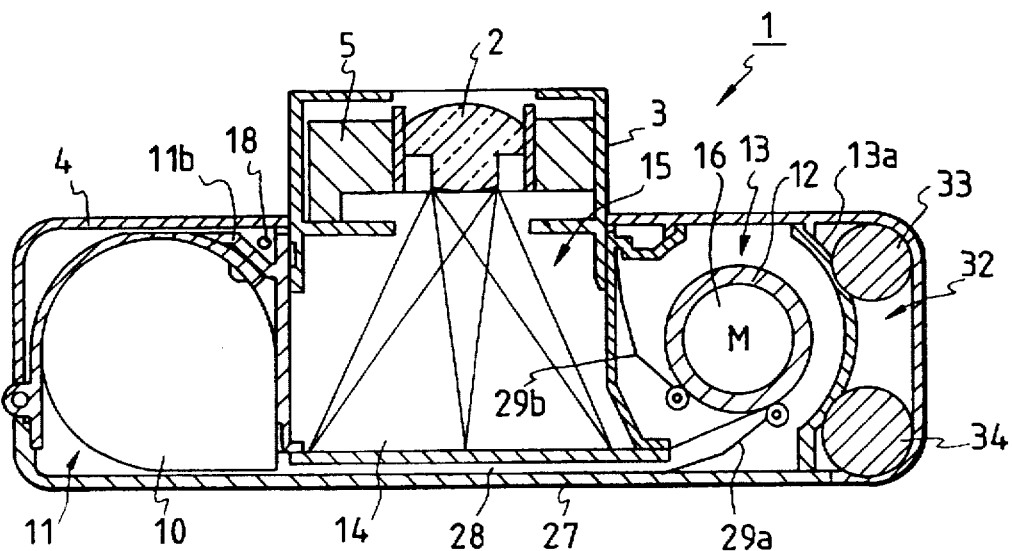
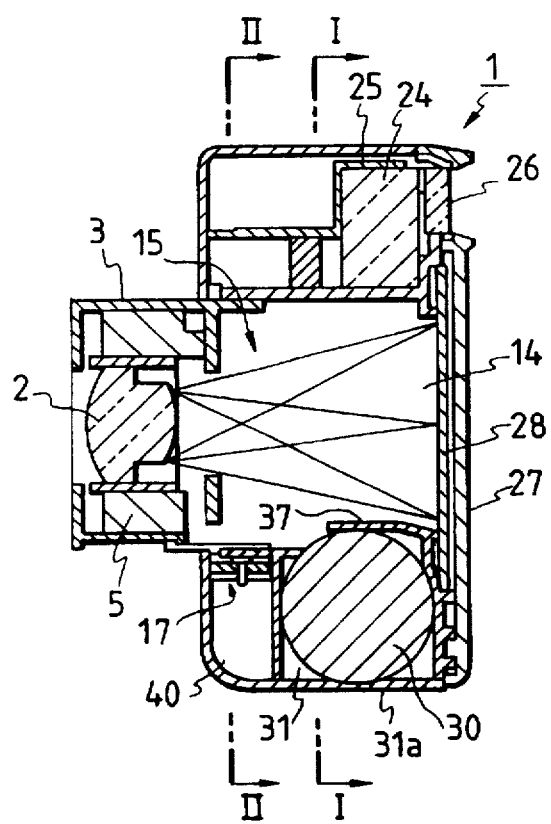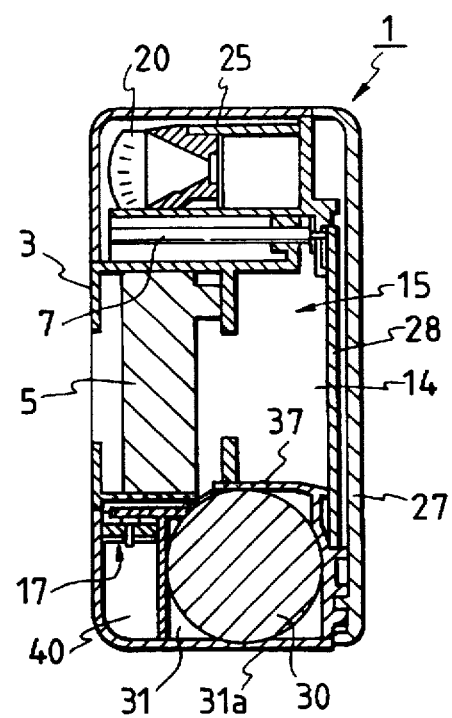

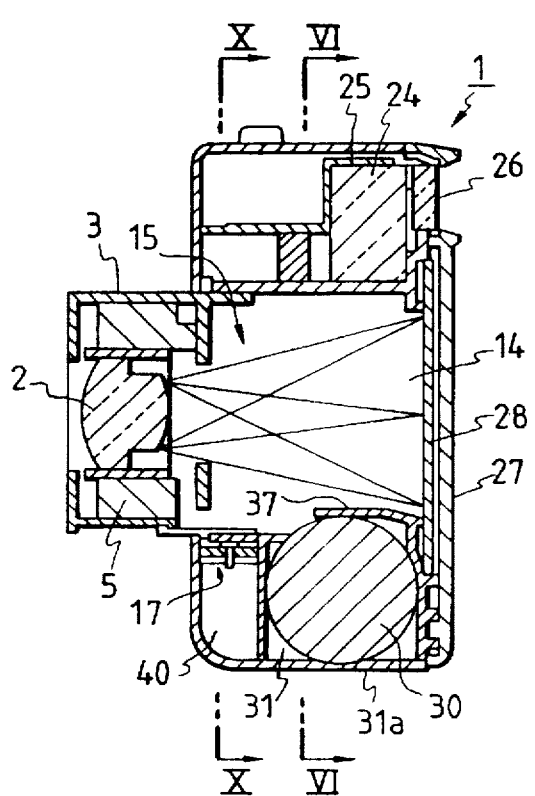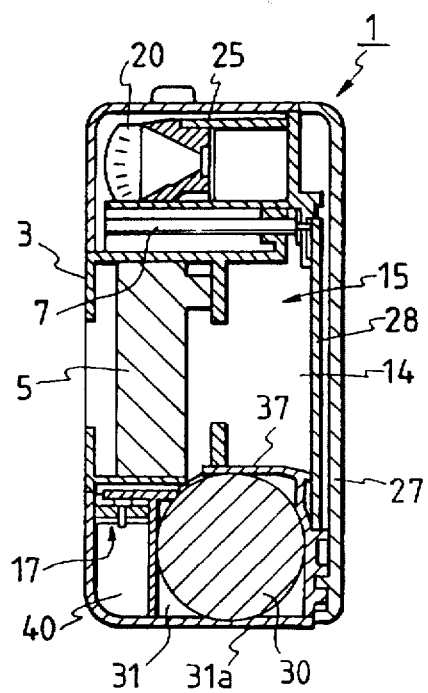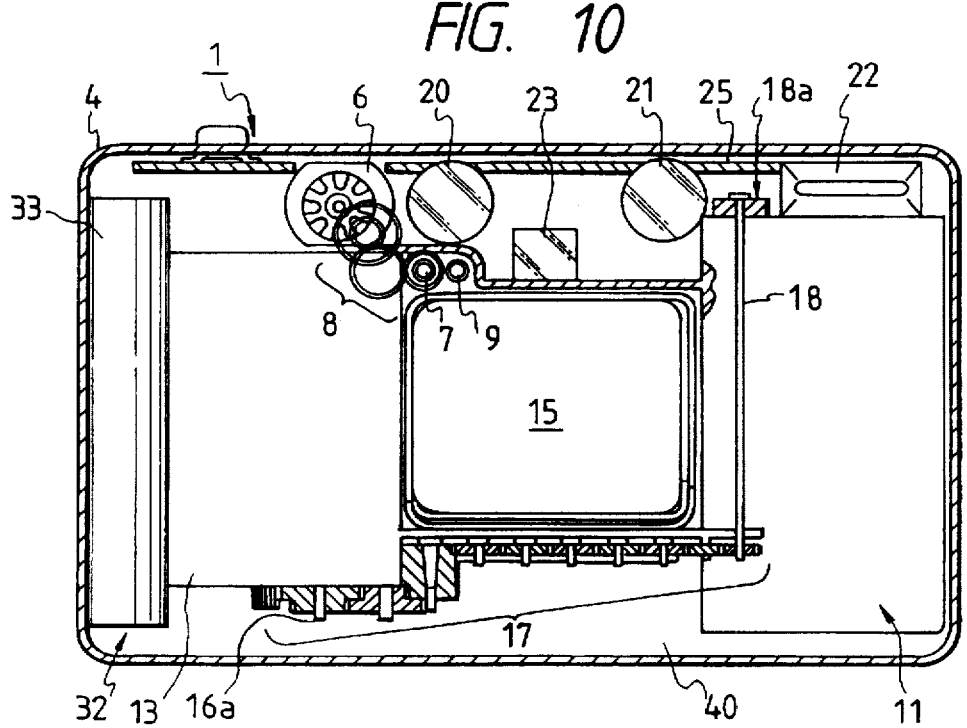

COMPACT FLASH CAMERA WITH BATTERY CHAMBER

This is a continuation of application Ser. No. 08/588,283 filed Jan. 18, 1996, which is a continuation of application Ser. No. 08/187,552 filed Jan. 28, 1994, both now abandoned.

BACKGROUND OF THE INVENTION

1. Field of the Invention

The present invention relates to a small camera called a compact camera.

2. Related Background Art

In a compact camera, the demand for making the whole of the camera small and compact is great in order to facilitate the carrying and handling thereof, and it is desired that parts to be incorporated into the body of the camera be incorporated as efficiently and compactly as possible.

In recent compact cameras it has generally been practiced to provide a power consuming portion such as a flashlight emitting device (flash device) within or exteriorly of the camera so that flash photographing can be effected.

In such a camera, it is necessary to incorporate a flash device charging battery or a flashlight emitting capacitor into the camera body and, moreover, a large capacity is desired.

Heretofore, in popular cameras, when incorporating such a battery or the like thereinto, there has been adopted such a design that a containing chamber is provided outside a spool chamber for taking up film fed from a cartridge in the camera body and the battery is incorporated into and disposed in the containing chamber.

On the other hand, improved portability and ease of handling are desired for cameras, and it is required to make the entire camera body compact below predetermined dimensions.

For this reason, there is also known a camera in which a bulged portion is provided on a portion of the front side or the back side of the camera body and a containing space is secured inside thereof so that a battery or the like may be incorporated thereinto. In the camera body having such a bulged portion, the gripping effect when levelling the camera can be attained, but the thickness of the camera body is increased, and this is inconsistent with the need to make the camera small and compact.

With the increasing use of electronics in cameras, a larger capacity of the battery is needed. Further, in cameras provided with a flash device, a larger capacity of the capacitor is also desired in order to shorten the charging time. With a battery or capacitor of larger capacity, the increased dimensions of its outer diameter have posed a problem in incorporating it into the camera. That is, where the battery or capacitor is disposed in the side portion of the camera, the camera will become laterally long correspondingly to the larger diameter, and this has been a great obstacle to achieving the downsizing and compactness of the camera.

When, the battery or the like is incorporated and disposed in one side portion in the widthwise direction of the camera body, there is also a problem in achieving the downsizing and compactness of the camera.

SUMMARY OF THE INVENTION

It is an object of the present invention to provide a camera of which the body can be made as compact as possible and which permits a battery or the like desired to be made larger in capacity to be efficiently and compactly incorporated into the camera body.

According to the present invention, there is provided a camera capable of effecting flash photographing by an electronic flash device and including, in the body thereof, a film cartridge chamber, a film take-up spool chamber and a photographing optical path chamber provided between and adjacent to these two chambers and formed between a photo-taking lens and an aperture portion defining an image field. The camera is characterized by the provision of a power supply battery chamber surrounded by the cartridge chamber, the spool chamber and the photographing optical path chamber for containing therein a power supply battery having a length substantially equal to the lengthwise dimension of the photographing image field, and a capacitor for electronic flash device light emission disposed in the camera body along that side portion of the spool chamber which is adjacent to the cartridge chamber.

Further, according to the present invention, there is provided a camera including, in the body thereof, a film cartridge chamber, a film take-up spool chamber and a photographing optical path chamber provided between and adjacent to these two chambers and formed between a photo-taking lens and an aperture portion defining an image field. The camera is provided with a power supply battery chamber formed between the cartridge chamber and the spool chamber and at one side of the photographing optical path chamber, and is characterized in that the spacing between a first partition wall partitioning the power supply battery chamber and the cartridge chamber and a second partition wall partitioning the power supply battery chamber and the spool chamber is substantially equal to the dimension of the photographing optical path chamber in a film feeding direction.

The above and other objects, features and advantages of the present invention will become more fully apparent from the following detailed description taken in conjunction with the accompanying drawings.

BRIEF DESCRIPTION OF THE DRAWINGS

FIG. 3 is a schematic cross-sectional view of the camera as it is seen from a plan direction.

FIG. 4 is a schematic cross-sectional view of the camera as it is seen from a side thereof.

FIG. 5 is a schematic cross-sectional view showing a case where, a lens barrel is retracted into the camera body.

FIG. 8 is a schematic cross-sectional view of the camera as it is seen from a side thereof.

FIG. 9 is a schematic cross-sectional view showing a case where a lens barrel is retracted into the camera body.

FIG. 10 is a cross-sectional view taken along line X—X in FIG. 8.

DESCRIPTION OF THE PREFERRED EMBODIMENTS

Figure 1:
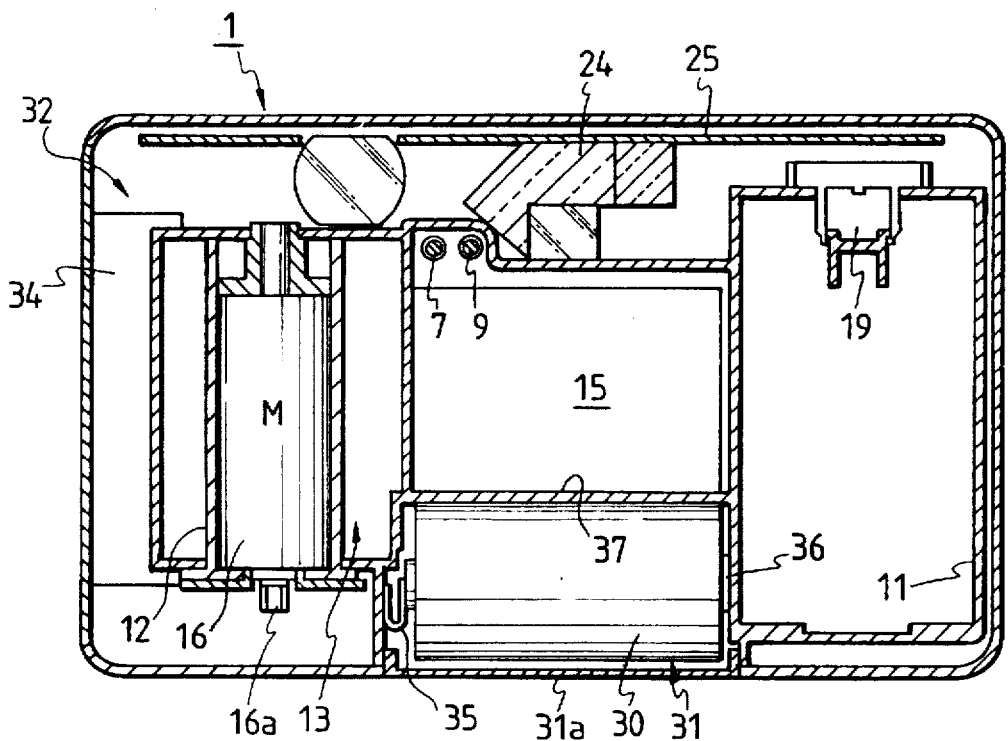
FIG. 1 is a schematic cross-sectional view of an embodiment of a camera according to the present invention as it is seen from the front side thereof.

Referring to FIGS. 1 to 5 which show an embodiment of a camera according to the present invention, the camera generally designated by the reference numeral 1 is a compact camera in which a lens barrel 3 having a photo-taking lens 2 is provided for forward and backward movement. The lens barrel 3, as is apparent from FIGS. 4 and 5, is designed to assume a photo-taking state in which it is protruded forwardly of a camera body 4 or a retracted state in which it is contained in the camera body 4.

Figure 2:
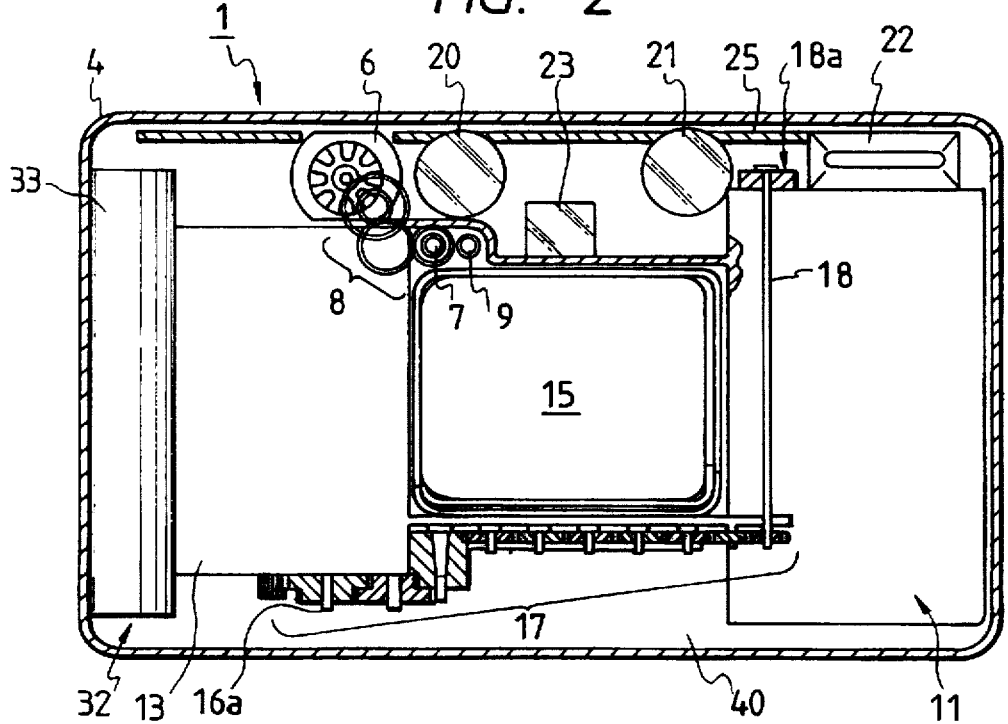
FIG. 2 is a schematic cross-sectional view showing the camera sectioned at a position different from FIG. 1.

A shutter unit 5 is disposed in the lens barrel 3, and this shutter unit has a lens shutter mechanism for holding the photo-taking lens 2 and opening and closing a photographing optical path. As shown in FIG. 2, a barrel driving motor 6 for driving the lens barrel 3 forwardly or backwardly is disposed in the upper portion of the interior of the camera body 4, and the rotation of this motor 6 is transmitted through a reduction gear train 8 to a barrel driving feed screw 7 for moving the lens barrel 3 forwardly or backwardly. The lens barrel 3 is moved forwardly or backwardly on a guide pin 9 for guiding and supporting it for forward and backward movement in the camera body. The above-described lens barrel 3 is adapted to be moved forwardly and backwardly for focusing by AF (auto focusing) or for zooming operation of a zoom lens and the like.

A cartridge chamber 11 loaded with a film cartridge 10 is formed in one side portion (the right-hand side in FIGS. 1 and 2, and the left-hand side in FIG. 3) in the camera body 4, and a spool chamber 13 having a film take-up spool 12 therein is formed in the other side portion (the left-hand side in FIGS. 1 and 2, and the right-hand side in FIG. 3). A photographing optical path chamber 15 through which a photographing optical path to a film surface passes is formed between an aperture portion 14 through which passes film fed between the cartridge chamber 11 and the spool chamber 13 and the photo-taking lens 2. In this embodiment, the photo-graphing optical path chamber 15 serves also as a barrel chamber for containing the lens barrel 3 therein.

A motor 16 for film winding and rewinding is provided in the spool 12, and the output thereof is transmitted as a drive force through a film rewinding gear train 17 for film rewinding power transmission, a transmission shaft 18 and a transmission gear train 18a (only a portion of which is shown) to a rewinding fork 19 facing the cartridge chamber 11. In FIG. 3, the reference character 11b designates a Dx contact for reading the film speed indication code of the cartridge 10 inserted into the cartridge chamber 11.

A light projecting lens 20 and light receiving lens 21 for AF (auto focusing) are disposed in the upper portion of the interior of the camera body 4, and a flashlight emitting unit 22 is disposed in the upper portion of the camera body 4 and above the cartridge chamber 11. Further, a finder objective lens 23, a real image finder optical system 24, an electric part mounting base plate 25 and a finder eyepiece 26 are disposed in the camera body 4. A back lid 27 is provided on the back side of the camera body 4, and a film urging plate 28 for urging the film against the aperture portion 14 is mounted on the back lid 27. Further, as shown in FIG. 3, a back lid side film roller 29a and a camera body side film roller 29b are both attached to the outer peripheral portion of the spool 12.

Now, according to the present embodiment, the camera 1 capable of effecting the flash photographing by the flashlight emitting unit 22 as described above is characterized in that the space portion in the camera body 4 surrounded by the cartridge chamber 11, the film take-up spool chamber 13 and the photographing optical path chamber 15 between the photo-taking lens 2 and the aperture portion 14 is used as a battery chamber (power supply battery chamber) 31 for containing a battery 30 therein which is substantially equal in lengthwise dimensions to the photographing image field. Also, capacitors 33 and 34 for flashlight emission are disposed along a side portion of the spool chamber 13 in the containing space 32 of the spool chamber 13 in the camera body 4 which is opposite to the cartridge chamber 11. The battery 30 having a positive electrode and a negative electrode disposed at associated terminals 35 and 36 is covered with a battery chamber cover 31a and is held in the battery chamber.

According to such a construction, the amount of outward protrusion of the containing space 32 of the side portion of the spool chamber 13 in the camera body 4, which has heretofore been the cause of the camera body becoming laterally long, is rendered to a necessary minimum. In particular, because a pair of capacitors 33 and 34 is used, the capacitors may have a small diameter, whereby the lateral dimension of the camera body 4 can be made small. Particularly, as shown in FIG. 3, the capacitors 33 and 34 are disposed in the front and rear portions of the camera body 4 which are defined by the arcuate surface of the partition wall 13a forming the spool chamber 13 and which are spatially most abundant, whereby the lateral downsizing of the camera can be achieved. Further, since the battery 30 is contained by the efficient utilization of the lower space portion beneath the photographing optical path chamber 15, the downsizing of the whole camera body 4 can be achieved.

In the design of the present embodiment, attention is paid to the fact that among batteries of various types, the battery 30 used chiefly for a compact camera has a length substantially equal to the lengthwise direction of the photographing image field. Thus, the space portion formed between the cartridge chamber 11 and the spool chamber 13 at the opposite sides of the camera body and beneath the photographing optical path chamber 15 between the photo-taking lens 2 and the aperture portion 14 is used as the battery chamber 31, and the battery 30 is disposed with its lengthwise dimension oriented laterally of the camera (side-to-side). Also, two capacitors 33 and 34 for flashlight emission, each having a small diameter, are disposed in the side space (containing space 32) of the spool chamber 13. Since a plurality of capacitors are adopted, the diameter of each capacitor may be small.

In the prior art, a battery and a single capacitor for flashlight emission have been disposed in the side space of the spool chamber. Consequently, the lateral dimension of the camera has been long correspondingly to the diametric dimensions of the battery and the capacitor. By contrast, in the present embodiment, the capacitors 33 and 34 reduced in diameter need only be incorporated, and thus, the lateral dimension of the camera can be shortened to make the camera small and compact.

According to the present embodiment, the partition wall 37 partitioning the battery chamber 31 and the photographing optical path chamber 15 is formed so as to bulge toward but not to interfere with the photographing optical path leading from the photo-taking lens 2 to the film surface, whereby the amount of protrusion of the battery chamber 31 toward the lower portion of the camera body 4 is suppressed, and the downsizing of the camera body 4 in the top-to-bottom direction thereof can be achieved more effectively.

The photographing optical path forming a standard image field from the photo-taking lens 2 onto the film surface has a margin in the photographing optical path chamber 15. Accordingly there will be no problem in practical use even if the partition wall 37 forming the battery chamber 31 is bulged toward the photographing optical path, but so that it does not interfere with the photographing optical path.

Also, according to the present embodiment, the film rewinding gear train 17 for transmitting the film rewinding power to the film cartridge 10 is disposed along the lengthwise direction of the battery 30 in the space 40 formed at one side of the battery chamber 31 in the direction of thickness (front-to-back direction) of the camera body 4. Because the space 40 is utilized to dispose the film rewinding gear train 17 therein, the gear train 17 can be efficiently disposed in the space within the camera, and this contributes to the downsizing of the whole camera body 4.

FIGS. 6 to 10, in which portions identical or corresponding to the portions shown in FIGS. 1 to 5 are given the same reference characters, show another embodiment of the camera according to the present invention. In these figures, the camera generally designated by the reference numeral 1 is a compact camera in which a lens barrel 3 having a photo-taking lens 2 is provided for forward and backward movement.

The lens barrel 3, as is apparent from FIGS. 8 and 9, is designed to assume a photographing position in which it is protruded forwardly of the camera body 4 or a retracted position in which it is contained in the camera body 4.

A shutter unit 5 is disposed in the lens barrel 3, and this shutter unit has a lens shutter mechanism for holding the photo-taking lens 2 and opening and closing the photographing optical path. As shown in FIG. 10, a barrel driving motor 6 for driving the lens barrel 3 forwardly and backwardly is disposed in the upper portion of the interior of the camera body 4, and the rotation of this motor 6 is transmitted through a reduction gear train 8 to a barrel driving feed screw 7 for moving the lens barrel 3 forwardly or backwardly. The lens barrel 3 is moved forwardly or backwardly on a guide pin 9 for guiding and supporting it for forward or backward movement in the camera body. Also, the lens barrel 3 is adapted to be moved forwardly or backwardly for focusing by AF (auto focusing).

Figure 6:
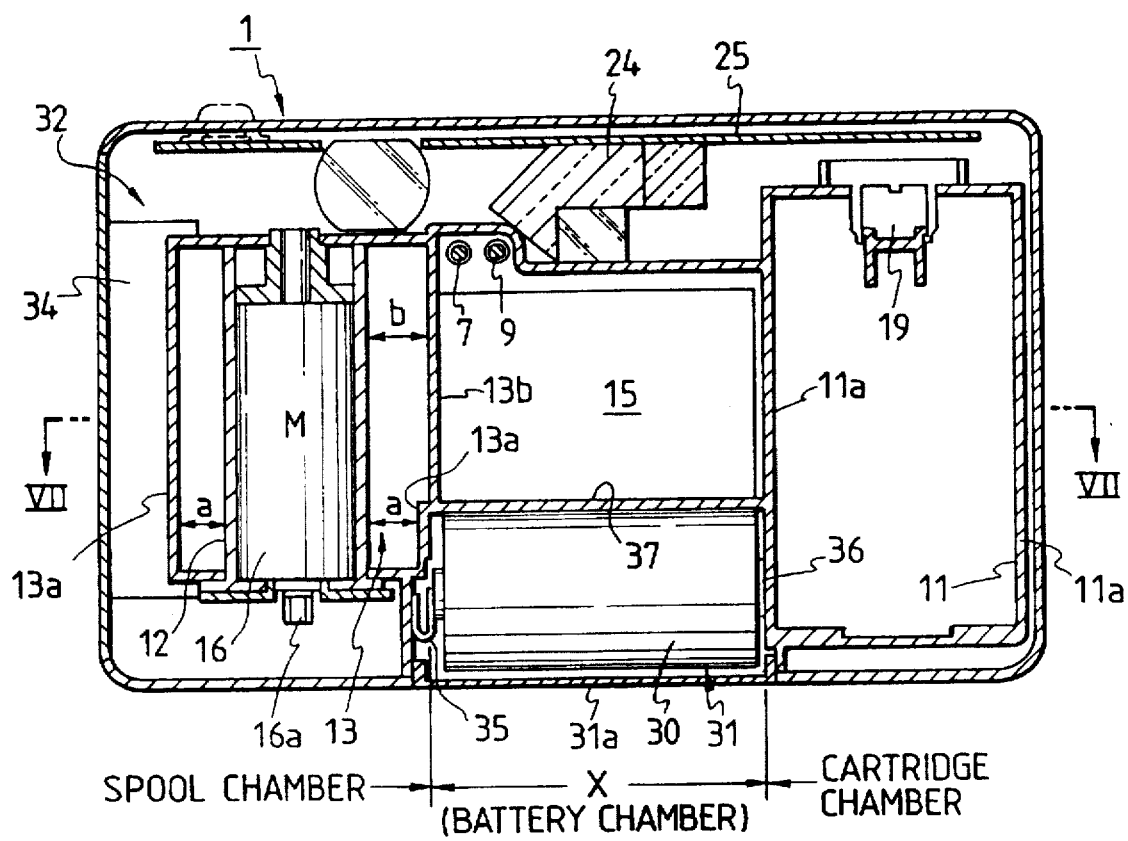
FIG. 6 is a schematic cross-sectional view of another embodiment of the camera according to the present invention as it is seen from the front side thereof.
Figure 7:
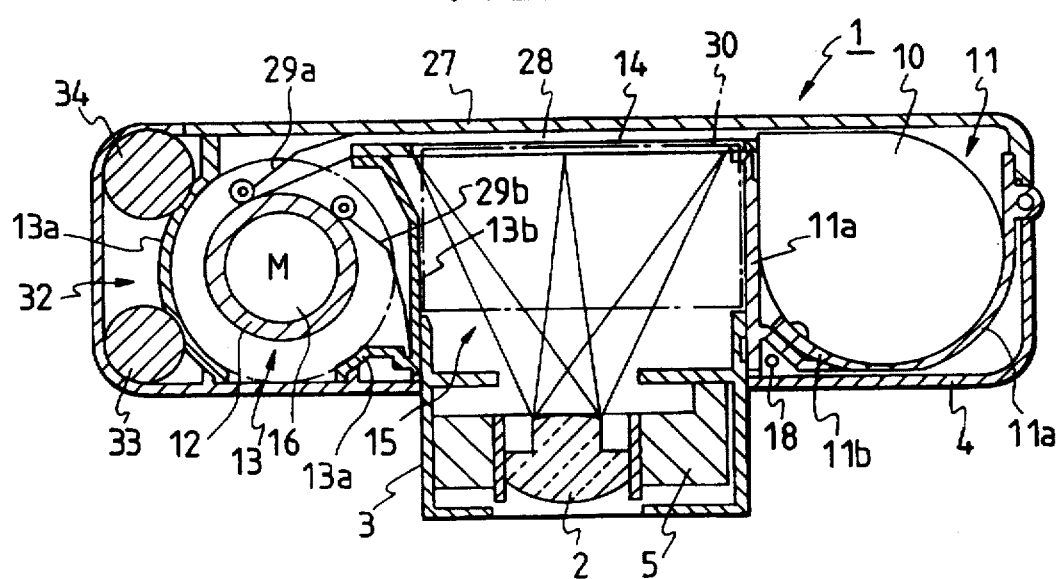
FIG. 7 is a cross-sectional view taken along line VII—VII in FIG. 6.

A film cartridge chamber 11 loaded with a film cartridge 10 is formed in one side portion (the right-hand side in FIGS. 6, 7 and 10) in the camera body 4, and a film take-up spool chamber 13 having a film take-up spool 12 therein is formed in the other side portion (the left-hand side in FIGS. 6, 7 and 10).

Further, an aperture portion 14 prescribing the range of a photographing image field is provided between the cartridge chamber 11 and the take-up spool chamber 13, and a photographing optical path chamber 15 through which a photographing optical path to a film surface passes between the aperture portion 14 and the photo-taking lens 2 is formed between and adjacent to the two chambers 11 and 13. In this embodiment, the photographing optical path chamber 15 serves also as a barrel chamber for containing the lens barrel 3 therein.

The cartridge chamber 11 is defined by a partition wall 11a, and the take-up spool chamber 13 is defined by a partition wall 13a and a wall portion 13b. As is apparent from FIGS. 6 and 7, on the take-up spool chamber 13 side, the wall portion 13b is formed relative to the ordinary partition wall 13a of the spool chamber 13 in order to provide a film roller 29b which will be described later. That is, in FIG. 6, the dimension a is the clearance dimension of a film take-up annular clearance formed in the spool chamber 13 between the spool 12 and the partition wall 13a, and the dimension b is the gap between a wall portion for mounting the film roller 29b and the spool 12 which is greater than the dimension a.

The photographing optical path chamber 15 is formed between the partition wall 11a of the cartridge chamber 11 side and the wall portion 13b of the spool chamber 13 side and adjacent to these two chambers 11 and 13.

A motor 16 for winding and rewinding the film is provided in the spool 12, and the output thereof is transmitted as a drive force through a film rewinding gear train 17 for film rewinding power transmission, a transmission shaft 18 and a transmission gear train 18a (only a portion of which is shown) to a rewinding fork 19 facing the interior of the cartridge chamber 11. As shown in FIG. 7, a DX contact 11b for reading the film speed indication code of the cartridge 10 inserted into the cartridge chamber 11 is disposed on the partition wall 11a.

Also, a light projecting lens 20 and a light receiving lens 21 for AF (auto focusing) are disposed in the upper portion of the camera body 4, and a flashlight emitting unit 22 is disposed in the upper portion of the camera body 4 and above the cartridge chamber 11. Further, a finder objective lens 23, a real image finder optical system 24, an electric part mounting base plate 25 and a finder eyepiece 26 are disposed in the camera body 4. A back lid 27 is provided on the back side of the camera body 4, and a film urging plate 28 for urging the film against the aperture portion 14 is mounted on the back lid 27. Further, as shown in FIG. 7, a back lid side film roller 29a and the above-mentioned camera body side film roller 29b are both attached to the outer peripheral portion of the spool 12.

In the camera 1 of the construction as described above, the space portion in the camera body 4 surrounded by the cartridge chamber 11, the film take-up spool chamber 13 and the photographing optical path chamber 15 between the photo-taking lens 2 and the aperture portion 14 is used as a battery chamber (power supply battery chamber) 31 for containing a battery 30 which is a power supply battery for the camera 1.

That is, according to the present embodiment, in the camera body 4, there are provided the cartridge chamber 11 and the take-up spool chamber 13, and the photographing optical path chamber 15 is provided between and adjacent to these two chambers 11 and 13 and between the photo-taking lens 2 and the aperture portion 14. The battery chamber 31 for containing the battery 30 therein is provided between the cartridge chamber 11 and the spool chamber 13 and at one side of the photographing optical path chamber 15 with the respective partition walls 11a, 13a and a partition wall 37a (described hereinafter). The spacing between the partition wall 11a partitioning the battery chamber 31 and the cartridge chamber 11 and the partition wall 13a partitioning the battery chamber 31 and the spool chamber 13 is made substantially equal to the length of the photographing optical path chamber 15, (the dimension in the direction of movement of the film) and the battery 30 having a length x substantially equal to the length dimension of the photographing optical path chamber 15 in the direction of movement of the film is contained an disposed in the battery chamber 31.

According to such a construction, in the camera body 4 the battery chamber 31 can be formed with a maximum space between the cartridge chamber 11 and the take-up spool chamber 13 and to one side of (beneath) the photographing optical path chamber 15, and the battery 30 having the length x substantially equal to the length dimension of the photographing optical path chamber 15 in the direction of movement of the film and made larger in capacity can be contained and disposed in the battery chamber 31. Accordingly, it becomes possible to make the whole of the camera 1 small and at the same time, efficiently incorporate the battery 30 maximized in capacity.

Particularly, the battery 30 is contained by the efficient utilization of the lower space portion beneath photographing optical path chamber 15 defined between the cartridge chamber 11 and the spool chamber 13. Therefore, the downsizing of the whole of the camera body 4 can be achieved. The battery 30 having a positive electrode disposed at associated terminals 35 and 36 and a negative electrode 36 is covered with a battery chamber cover 31a and is held in the battery chamber 31.

In the present embodiment, plural capacitors 32 and 33 for flashlight emission are disposed in the camera body 4 along a side portion of the spool chamber 13 in the containing space 32 which is opposite to the cartridge chamber 11.

If this is done, the amount of outward protrusion of the containing space 32 in the side portion of the spool chamber 13 in the camera body 4, which has heretofore been the cause of the camera body becoming laterally long, is rendered to a necessary minimum. In particular, because a pair of capacitors 33 and 34 is used, the capacitors may have a small diameter, whereby the lateral dimension of the camera body 4 can be made small. Particularly, as shown in FIG. 7, the capacitors 33 and 34 are disposed in the front and rear portions of the camera body 4 which are defined by the arcuate surface of the partition wall 13a forming the spool chamber 13 and which are spatially most abundant, whereby the lateral downsizing of the camera can be achieved.

In the design of the present embodiment, attention is paid to the fact that among batteries of various types, the battery 30 used chiefly for a compact camera has a length substantially equal to the lengthwise direction of the photographing image field. Thus, the space portion formed between the cartridge chamber 11 and the spool chamber 13 at the opposite sides of the camera body 4 and in the lower portion beneath the photographing optical path chamber 15 between the photo-taking lens 2 and the aperture portion 14 is used as the battery chamber 31, and the battery 30 is disposed with its lengthwise dimension oriented laterally of the camera. Also, two capacitors 33 and 34 for flashlight emission, each having small diameter, are disposed in the side space (containing space 32) of the spool chamber 13. Since a plurality of capacitors 33 and 34 are adopted, the diameter of each capacitor may be small.

In the prior art, a battery and a single capacitor for flashlight emission have been disposed in the side space of the spool chamber. Consequently, the lateral dimension of the camera has been long correspondingly to the diametric dimensions of the battery and the capacitor. By contrast, in the present embodiment, the capacitors 33 and 34 reduced in diameter need only be incorporated, and thus, the lateral dimension of the camera can be shortened to make the camera 1 small and compact.

Further, in the second embodiment, the partition wall 37 partitioning the battery chamber 31 and the photographing optical path chamber 15 is bulged toward but so as not to interfere with the photographing optical path leading from the photo-taking lens 2 to the film surface, whereby the amount of protrusion of the battery chamber 31 toward the lower portion of the camera body 4 is suppressed, so that the downsizing of the camera body 4 in the top-to direction thereof can be achieved more effectively.

The photographing optical path forming a standard image field from the photo-taking lens 2 onto the film surface has a margin in the photographing optical path chamber 15. Accordingly there will be no problem in practical use even if the partition wall 37 forming the battery chamber 31 is bulged toward but so as not to interfere with the photographing optical path.

Also, the film rewinding gear train 17 for transmitting the film rewinding power to the film cartridge 10 is disposed along the lengthwise direction of the battery 30 in the space 40 formed at one side of the battery chamber 31 in the direction of thickness (front-to-back direction) of the camera body 4.

Because the space 40 is utilized to dispose the film rewinding gear train 17 therein, the gear train 17 can be efficiently disposed in the space within the camera, and this contributes to the downsizing of the whole camera body 4.

Figure 11:
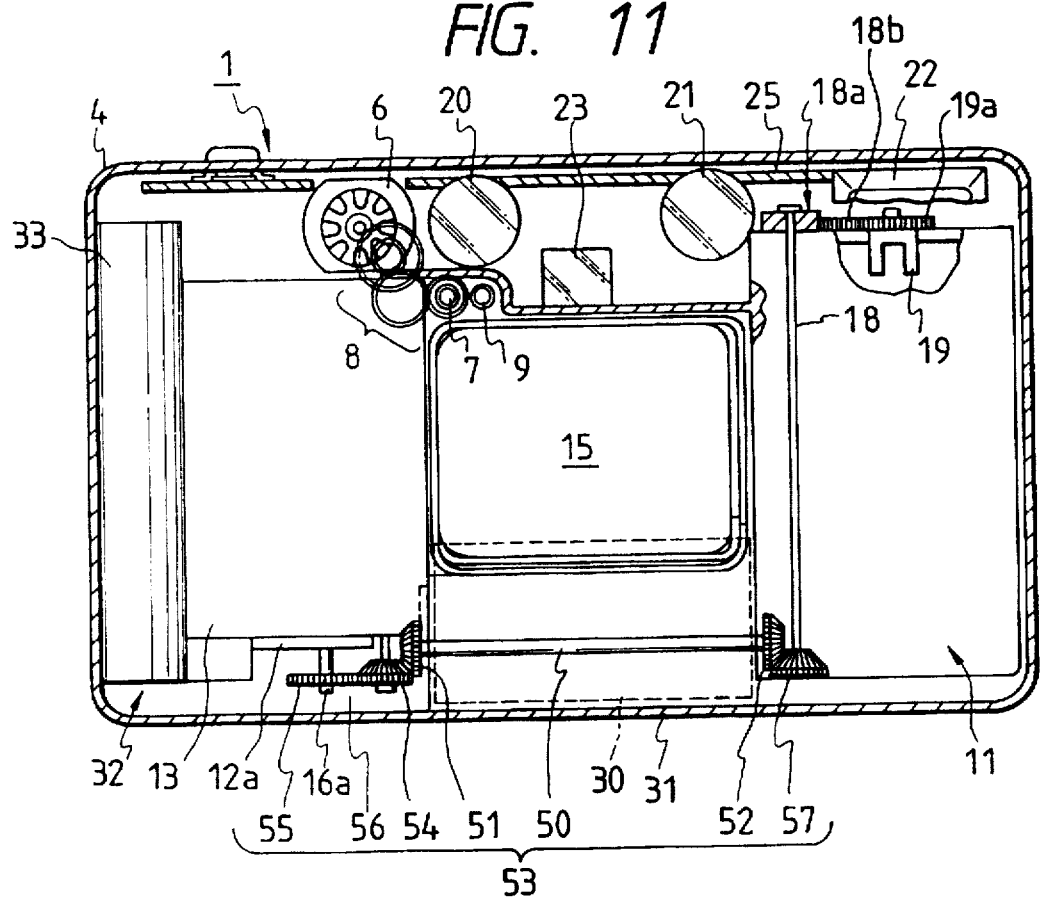
FIG. 11 shows still another embodiment of the camera according to the present invention, and is a schematic cross-sectional view of those portions in the above-mentioned embodiment which correspond to FIG. 10.
Figure 12:
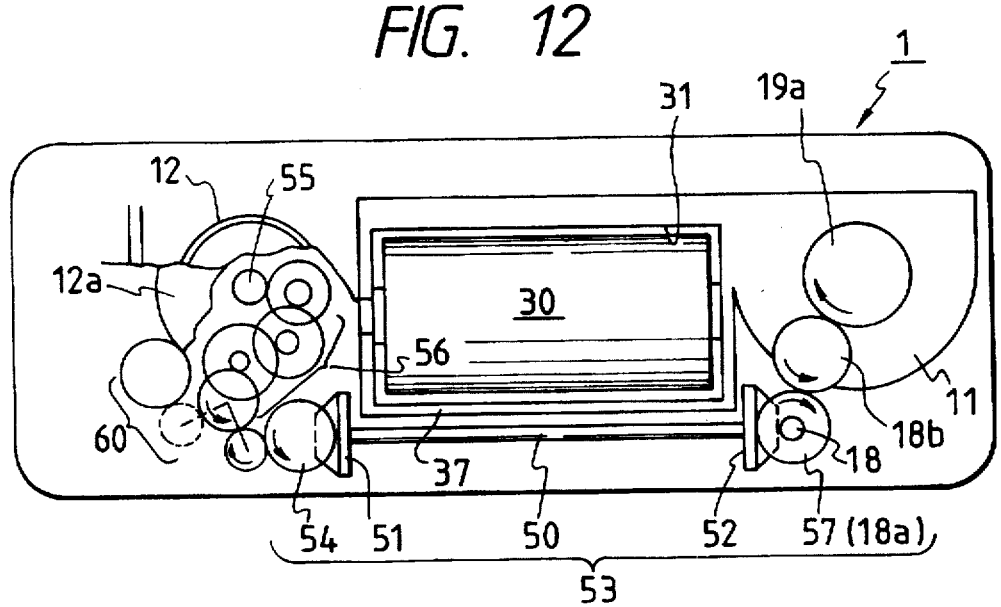
FIG. 12 is a schematic view showing the relationships between various portions in the camera of FIG. 11 as it is seen from a plan direction.
Figure 13:
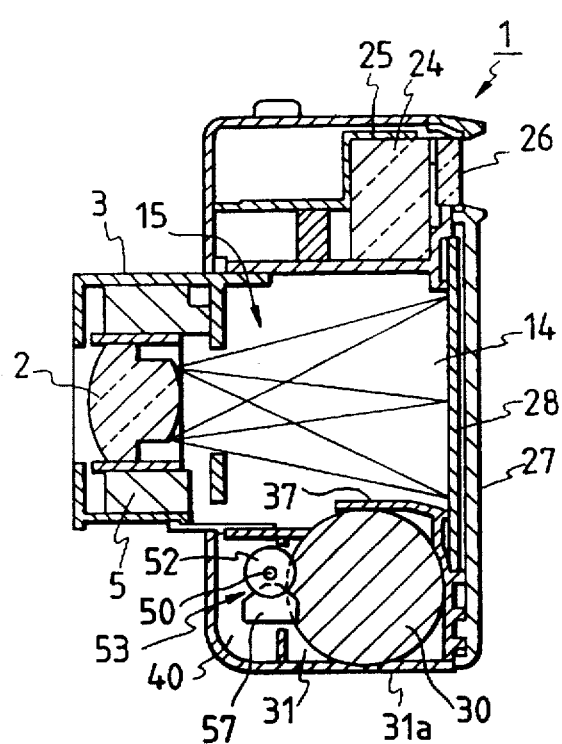
FIG. 13 is a schematic cross-sectional view of the camera as it is seen from a side thereof.

FIGS. 11 to 13 show still another embodiment of the camera according to the present invention.

In this embodiment, a film rewinding power transmitting mechanism 53 provided with a transmission shaft 50 having bevel gears 51 and 52 on the opposite ends thereof is employed in lieu of the film rewinding gear train 17 for transmitting the rotative drive force from the motor 16 provided in the spool 12 to the film rewinding fork 19 facing the interior of the cartridge chamber 11 and engaged with the cartridge 10 side.

In these figures, a bevel gear 54 meshing with a gear 55 on the motor shaft 16a through a gear train 56 meshes with the bevel gear 51 on one end of the transmission shaft 50, whereby this transmission shaft 50 is rotatively driven.

On the other hand, a bevel gear 57 meshes with the bevel gear 52 on the other end of the transmission shaft 50, and the rotation thereof is directed from below to above in the camera 1 through a transmission shaft 18 and is transmitted as rotative power to a gear 19a on the fork 19 through transmission gear trains 18a and 18b.

Further, in FIG. 12, a gear 12a is provided on a spool 12 and a film winding gear train 60 for transmitting the rotative power from the motor 16 thereto is also provided, but the detailed description thereof is omitted herein.

By the use of the transmitting mechanism 53 using the transmission shaft 50 having such bevel gears 51 and 52, the bevel gears 51 and 52 on the opposite ends are disposed in the opposite ends of the battery chamber 31, as is apparent from FIGS. 11 to 13, whereby it becomes possible to make the thickness of the camera 1 small.

This will be readily understood from the fact that, as shown in FIG. 13, the bevel gears 51, 52 and bevel gears 54, 57 meshing therewith can be disposed in such a manner as to overlap the battery chamber 31 in the thickness direction of the camera.

The present invention is not limited to the structure of the above-described embodiments, and, the shapes, structure, etc. of the various portions of the camera can, of course, be of course, suitably modified or changed.

For example, the case of a compact camera has been shown in the above-described embodiments. However, this is not limitative, and the present invention can be effectively applied to cameras of various types including single-lens reflex cameras.

As described above, the camera according to the first embodiment is provided with a power supply battery chamber for containing therein a power supply battery substantially equal in lengthwise dimension to the photographing image field, and the battery chamber is surrounded by the cartridge chamber, the spool chamber and the photographing optical path chamber. Also, a capacitor for flashlight emission (more preferably, a pair of capacitors) is disposed in the camera body along that side portion of the spool chamber which is opposite to the cartridge chamber. With this simple construction, the amount of outward protrusion of the containing space in the side portion of the spool chamber of the camera body, which has heretofore been the cause of the camera becoming laterally long, is rendered to a necessary minimum, whereby the lateral dimension of the camera body can be made small. Moreover, the construction admits of larger battery and capacitor capacity, while the downsizing of the whole camera body can still be achieved.

Also, the camera according to the second embodiment is provided with a power supply battery chamber for containing a power supply battery therein and which is formed to one side of the photographing optical path chamber between the cartridge chamber and the spool chamber, and the spacing between the first partition wall partitioning the power supply battery chamber and the cartridge chamber and the second partition wall partitioning the power supply battery chamber and the spool chamber is substantially equal to the length of the photographing optical path chamber. Therefore, with a simple construction, a battery chamber is formed with a maximum space in the downsized camera body to one side of the photographing optical path chamber between the cartridge chamber and the take-up spool chamber, and a battery having a length substantially equal to the dimension of the photographing optical path chamber in the direction of movement of the film and maximized in capacity can be contained and disposed in the battery chamber, whereby the downsizing of the whole camera can be achieved and at the same time, the battery can be made as large as possible in capacity.

Particularly, according to the present invention, the downsizing of the camera body 4 can be achieved as far as possible and it is possible to utilize the interior thereof as efficiently as possible to contain the battery 30. Therefore, even if the battery 30 is required to be made large in capacity, it can be easily accommodated.

Also, according to the present invention, the partition wall partitioning the battery chamber for containing the battery therein and the photographing optical path chamber is provided so as to face the photographing optical path chamber at a location near to but which does not interfere with the photographing optical path in the photographing optical path chamber leading from the photo-taking lens to the film surface. The battery chamber is thus provided so as be bulged toward but so not to interfere with the photographing optical path in the photographing optical path chamber, whereby the camera body can be made smaller and more compact.

Further, according to the present invention, a film rewinding gear train for transmitting the film rewinding power to the film cartridge or a power transmission shaft having bevel gears disposed on the opposite ends thereof is disposed along the lengthwise direction of the battery in the space formed at one side of the battery chamber in the direction of thickness of the camera body. Therefore the space formed in the battery chamber in the direction of thickness of the camera body is utilized to dispose the film rewinding gear train or the power transmission shaft, whereby the downsizing of the whole camera body can be achieved.

What is claimed is:

1. A camera capable of effecting flash photographing by an electronic flash device and including, in a body thereof, a film cartridge chamber, a film take-up spool chamber having a film take-up spool therein, and a photographing optical path chamber provided between and adjacent to said film cartridge and spool chambers and formed between a photo-taking lens and an aperture portion defining an image field, characterized by the provision of:

a power supply battery chamber substantially surrounded by said cartridge chamber, said spool chamber, and said photographing optical path chamber for containing a power supply battery of substantially equal lengthwise dimension to said image field;

a capacitor for light emission of the electronic flash device and which is disposed in said camera body along a side portion of said spool chamber opposite from said cartridge chamber;

a film feeding motor built in said film take-up spool to be powered by the power supply battery; and a film rewinding gear train disposed in a space formed at one side of said power supply battery chamber in a front-to-back direction of said camera body, so as to extend along a lengthwise direction of the power supply battery contained in said power supply battery chamber, for transmitting film rewinding power from said film feeding motor to a film cartridge inserted in said cartridge chamber.

2. A camera including, in a body thereof, a film cartridge chamber, a film take-up spool chamber having a film take-up spool therein, and a photographing optical path chamber provided between and adjacent to said film cartridge and spool chambers and formed between a photo-taking lens and an aperture portion defining an image field, said camera being provided with a power supply battery chamber formed between said cartridge chamber and said spool chamber to one side of said photographing optical path chamber, for containing a power supply battery, and a film feeding motor built in said film take-up spool to be powered by the power supply battery, said camera being characterized in that a spacing between a first partition wall partitioning said power supply battery chamber and said cartridge chamber and a second partition wall partitioning said power supply battery chamber and said spool chamber is substantially equal to a dimension of said photographing optical path chamber in a film feeding direction, said camera further including a film rewinding power transmitting mechanism having a portion disposed in a space formed at one side of said power supply battery chamber in a front-to-back direction of said camera body, so as to extend along a lengthwise direction of a power supply battery contained in said power supply battery chamber, for transmitting film rewinding power from said film feeding motor to a film cartridge inserted in said cartridge chamber.

3. The camera of claim 2, wherein said portion of said film rewinding power transmitting mechanism includes a gear train.

4. The camera of claim 2, wherein said portion of said film rewinding power transmitting mechanism includes a power transmission shaft, and bevel gears are disposed on the opposite ends of said power transmission shaft.

5. The camera of claim 1, wherein said film rewinding gear train includes gears that each rotate about a corresponding axis extending in a top-to-bottom direction of said camera body.

6. The camera of claim 3, wherein said gear train includes gears that each rotate about a corresponding axis extending in a top-to-bottom direction of said camera body.

7. A camera capable of effecting flash photographing by an electronic flash device and including, in a body thereof, a film cartridge chamber, a film take-up spool chamber having a film take-up spool therein, and a photographing optical path chamber provided between and adjacent to said film cartridge and spool chambers and formed between a photo-taking lens and an aperture portion defining an image field, characterized by the provision of:
- a power supply battery chamber substantially surrounded by said cartridge chamber, said spool chamber, and said photographing optical path chamber for containing a power supply battery of substantially equal lengthwise dimension to said image field;
- a capacitor for light emission of the electronic flash device and which is disposed in said camera body along a side portion of said spool chamber opposite from said cartridge chamber;
- a film feeding motor built in said film take-up spool to be powered by the power supply battery;
- a driving motor disposed in an area located to one side of said cartridge chamber, said spool chamber, and said photographing optical path chamber that is opposite from said power supply battery chamber, for driving a lens barrel with a lens and a shutter in the direction of the optical axis of the lens, said driving motor to be powered by the power supply battery; and
- a distance metering device disposed in said area, said distance metering device to be powered by the power supply battery.

8. The camera of claim 7, wherein a partition wall partitioning said power supply battery chamber and said photographing optical path chamber is bulged toward said photographing optical path chamber.

9. The camera of claim 7, further including a film rewinding gear train disposed in a space formed at one side of said power supply battery chamber in a front-to-back direction of said camera body, so as to extend along a lengthwise direction of the power supply battery contained in said power supply battery chamber, for transmitting film rewinding power from said film feeding motor to a film cartridge inserted in said cartridge chamber.

10. The camera of claim 9, wherein said film rewinding gear train includes gears that each rotate about a corresponding axis extending in a top-to-bottom direction of said camera body.

11. The camera of claim 7, including an additional capacitor for light emission of the electronic flash device, and wherein said capacitors for light emission of the electronic flash device are disposed, respectively, at front and rear portions of said side portion of said spool chamber.

12. The camera of claim 7, wherein a partition wall partitioning said power supply battery chamber and said photographing optical path chamber has a portion disposed substantially at a boundary of the photographing optical path, but not as to interfere with the photographing optical path.

13. A camera including, in a body thereof, a film cartridge chamber, a film take-up spool chamber having a film take-up spool therein, and a photographing optical path chamber provided between and adjacent to said film cartridge and spool chambers and formed between a photo-taking lens and an aperture portion defining an image field, said camera being provided with a power supply battery chamber formed between said cartridge chamber and said spool chamber to one side of said photographing optical path chamber, for containing a power supply battery, a film feeding motor built in said film take-up spool to be powered by the power supply battery, a driving motor disposed in an area located to one side of said cartridge chamber, said spool chamber, and said photographing optical path chamber that is opposite from said power supply battery chamber, for driving a lens barrel with a lens and a shutter in the direction of the optical axis of the lens, said driving motor to be powered by the power supply battery, and a distance metering device disposed in said area, said distance metering device to be powered by the power supply battery, said camera further being characterized in that a spacing between a first partition wall partitioning said power supply battery chamber and said cartridge chamber and a second partition wall partitioning said power supply battery chamber and said spool chamber is substantially equal to a dimension of said photographing optical path chamber in a film feeding direction.

14. The camera of claim 13, wherein a third partition wall partitioning said power supply battery chamber and said photographing optical path chamber is bulged toward said photographing optical path chamber.

15. The camera of claim 13, further including a film rewinding power transmitting mechanism having a portion disposed in a space formed at one side of said power supply battery chamber in a front-to-back direction of said camera body, so as to extend along a lengthwise direction of a power supply battery contained in said power supply battery chamber, for transmitting film rewinding power from said film feeding motor to a film cartridge inserted in said cartridge chamber.

16. The camera of claim 15, wherein said portion of said film rewinding power transmitting mechanism includes a gear train.

17. The camera of claim 16, wherein said gear train includes gears that each rotate about a corresponding axis extending in a top-to-bottom direction of said camera body.

18. The camera of claim 15, wherein said portion of said film rewinding power transmitting mechanism includes a power transmission shaft and bevel gears are disposed on the opposite ends of said power transmission shaft.

19. A camera capable of effecting flash photographing by an electronic flash device and including, in a body thereof, a film cartridge chamber, a film take-up spool chamber having a film take-up spool therein, and a photographing optical path chamber provided between and adjacent to said film cartridge and spool chambers and formed between a photo-taking lens and an aperture portion defining an image field, characterized by the provision of:
- terminal means disposed at opposite sides of a space substantially surrounded by said cartridge chamber, said spool chamber, and said photographing optical path chamber for electrically connecting to a power supply battery of substantially equal lengthwise dimension to said image field;
- a capacitor for light emission of the electronic flash device and which is disposed in said camera body along a side portion of said spool chamber opposite from said cartridge chamber;
- a film feeding motor built in said film take-up spool to be powered by the power supply battery;
- a driving motor disposed in an area located to one side of said cartridge chamber, said spool chamber, and said photographing optical path chamber that is opposite from said terminal means, for driving a lens barrel with a lens and a shutter in the direction of the optical axis of the lens, said driving motor to be powered by the power supply battery; and a distance metering device disposed in said area, said distance metering device to be powered by the power supply battery.

20. The camera of claim 19, including an additional capacitor for light emission of the electronic flash device, and wherein said capacitors for light emission of the electronic flash device are disposed, respectively, at front and rear portions of said side portion of said spool chamber.

21. A camera including, in a body thereof, a film cartridge chamber, a film take-up spool chamber having a film take-up spool therein, and a photographing optical path chamber provided between and adjacent to said film cartridge and spool chambers and formed between a photo-taking lens and an aperture portion defining an image field, said camera being provided with a space between a first partition wall of said cartridge chamber and a second partition wall of said spool chamber, said first and second partition walls being spaced from one another by a distance substantially equal to a dimension of said photographing optical path chamber in a film feeding direction, electric terminal means disposed near said first and second partition walls for connecting to a power supply battery, a film feeding motor built in said film take-up spool to be powered by the power supply battery, a driving motor disposed in an area located to one side of said cartridge chamber, said spool chamber, and said photographing optical path chamber that is opposite from said terminal means, for driving a lens barrel with a lens and a shutter in the direction of the optical axis of the lens, said driving motor to be powered by the power supply battery, and a distance metering device disposed in said area, said distance metering device to be powered by the power supply battery.

22. The camera of claim 21, including a pair of capacitors for light emission of an electronic flash device, said capacitors being disposed, respectively, at front and rear portions of a side portion of said spool chamber opposite from said cartridge chamber.

* * * * *